United States Patent [19]

Miyata et al.

[11] Patent Number: 4,642,193
[45] Date of Patent: Feb. 10, 1987

[54] METHOD FOR PURIFICATION OF THE COOLING WATER USED IN NUCLEAR REACTORS

[75] Inventors: Shigeo Miyata; Noriko Iizima, both of Takamatsu; Tadashi Manabe, Kagawa, all of Japan

[73] Assignee: Kyowa Chemical Industry Co. Ltd., Tokyo, Japan

[21] Appl. No.: 694,749

[22] Filed: Jan. 25, 1985

[30] Foreign Application Priority Data

Jan. 30, 1984 [JP] Japan .................................. 59-13389

[51] Int. Cl.$^4$ ............................................... C02F 1/42
[52] U.S. Cl. .................................... 210/682; 210/683; 210/685
[58] Field of Search ............... 210/660, 682, 683, 685; 502/400, 406, 414; 423/6

[56] References Cited

U.S. PATENT DOCUMENTS

| | | | |
|---|---|---|---|
| 3,428,568 | 2/1969 | Harker et al. | 210/682 |
| 4,178,270 | 12/1979 | Fujita et al. | 210/682 |
| 4,269,706 | 5/1981 | Sondermann | 210/682 |
| 4,547,620 | 10/1985 | Miyata et al. | 585/852 |

Primary Examiner—Ivars Cintins
Attorney, Agent, or Firm—Sherman & Shalloway

[57] ABSTRACT

A method of purifying cooling water used in nuclear reactors, which comprises contacting said cooling water with a hydrotalcite compound of the following formula $$M_{1-x}^{2+}M_x^{3+}(OH)_2 A_{x/n}^{n-} \cdot mH_2O \qquad (1)$$

wherein $M^{2+}$ represents a divalent metal cation, $M^{3+}$ represents a trivalent metal cation, $A^{n-}$ represents an anion having a valence of n, and x and m satisfy the following expressions $$0 < x < 0.5$$

$$0 \leq m < 1$$

or a calcined product thereof obtained by calcination at a temperature of up to about 900° C.; and a purifying agent used therefor.

9 Claims, No Drawings

METHOD FOR PURIFICATION OF THE COOLING WATER USED IN NUCLEAR REACTORS

This invention relates to a purifying agent for cooling water used in nuclear reactors, and a method for purification of the cooling water. Particularly, this invention relates to a purifying agent for cooling water used in nuclear reactors, which has resistance to high temperatures of up to about 350° C. that are much higher than those temperatures which ion exchange resins heretofore used in the purification of cooling water for nuclear reactors can withstand. The purifying agent of the invention is free from the prior disadvantage that recycle cooling water for nuclear reactors which has attained high temperatures has to be purified after it is cooled. Moreover, the purifying agent of the invention can efficiently capture and remove both cations, for example metal components dissolved out from pipings and being subject to radioactive contamination such as radioactive cobalt, and anions such as a chlorine ion which can get into the water during condensation by cooling with sea water and thus can efficiently and easily remove undesirable impurities in the cooling water.

More specifically, this invention relates to a purifying agent for cooling water used in nuclear reactors, said agent being composed of a hydrotalcite compound of the following formula

$$M_{1-x}{}^{2+}M_x{}^{3+}(OH)_2A_{x/n}{}^{n-}\cdot mH_2O \qquad (1)$$

wherein $M^{2+}$ represents a divalent metal cation, $M^{3+}$ represents a trivalent metal cation, $A^{n-}$ represents an anion having a valence of n, and x and m satisfy the following expressions $$0 < x < 0.5$$

$$0 \leqq m < 1$$

or a calcined product thereof obtained by calcination at a temperature of up to about 900° C.

More specifically, this invention also pertains to a method of purifying cooling water used in nuclear reactors, which comprises contacting said cooling water with the hydrotalcite compound of formula (1) or the calcined product thereof preferably in the form of granules. Preferably, the contacting is carried out at a temperature of about 100° to about 300° C.

It is well known that for example in boiling water-type nuclear power generation, cooling water for a nuclear reactor is gradually contaminated by cations of metal components in cooling water pipings, particularly those subject to radioactive contamination such as radioactive cobalt, and by a chlorine ion which can get into the cooling water when the cooling water boils at the center of the reactor to generate steam for driving a turbine and is then condensed by cooling, and that these ions are accumulated with the recycling of the cooling water.

Most of the metal cations and chlorine ion in the cooling water used in nuclear reactors are removed in a desalination step after the condensation step. But they still remain in unnegligible amounts in cooling water which has been desalinated, and cause troubles of radioactive contamination and corrosion. It is necessary therefore to purify the cooling water further.

In order to remove these impurities fully from cooling water used in nuclear reactors and maintain a high purity, a purifying method is now used which comprises decreasing the temperature of cooling water, which has been carried to a by-pass from its recycling circuit and being in the heated state at about 300° C., to a temperature below the upper limit of the temperature at which ion exchange resins can be used, for example to about 60° C., through a heat exchanger, and then purifying it with a cation exchange resin and an anion exchange resin.

According to this prior purifying method, the cooling water to be purified which is in the heated state usually at about 300° C. should be cooled to less than about 60° C. Hence, its heat loss is large. Moreover, since a considerably large amount of cooling water is used, the problem of heat losses is a great technical problem to be solved in the purification of cooling water for nuclear reactors. This above method further has the disadvantage of using both a cation and an anion exchange resin which are relatively expensive. In addition, the purifying efficiency of this method is not entirely satisfactory. It has been earnestly desired to develop a purifying agent for cooling water used in nuclear reactors and a method of purification thereof, which can advantageously overcome the aforesaid technical problem and disadvantage.

The present inventors have made extensive investigations in order to develop such a purifying agent and a purifying method, and have found that the hydrotalcite compound of formula (1) or a calcination of product thereof obtained by calcining it at a temperature of up to about 900° C., preferably in the form of granules containing it as a main component, is an excellent unique purifying agent for cooling water used in nuclear reactors, which has resistance to high temperatures of up to about 350° C. that are much higher than those temperatures which ion exchange resins heretofore used in the purification of cooling water for nuclear reactors can withstand; is free from the prior disadvantage that recycle cooling water for nuclear reactors which has attained high temperatures has to be purified after it is cooled; and can efficiently capture and remove both cations, for example metal components dissolved out from pipings and being subject to radioactive contamination such as radioactive cobalt, and anions such as a chlorine ion which can get into the water during condensation by cooling with sea water and thus can efficiently and easily remove undesirable impurities in the cooling water.

Investigations by the present inventors have led to the presumption that the hydrotalcite compound of formula (1) in accordance with this invention captures radioactive cobalt or other metal cations by depositing them in the form of a hydroxide or oxide on its crystal surface, and captures a chlorine and other anions by ion exchange reaction owing to its anion exchanging ability and the reaction of OH (structural water) with the anions, and that it consequently removes both such cations and anions from the cooling water for nuclear reactors.

The present inventors also presume that in a calcination product obtained by calcining the hydrotalcite compound of formula (1) at a temperature of up to about 900° C., a trivalent metal dissolves in a divalent metal oxide to form a solid solution, and that this solid solution captures on its crystal surface, in the presence of water, radioactive cobalt and other metal cations in the form of a hydroxide or oxide and thus removes them from the cooling water, and that when the solid solution is again converted to the hydrotalcite in the presence of water, the chlorine and other anions are taken into the resulting hydrotalcite as its one component and thus it captures the anions and removes them from the cooling water.

It should be understood however that the excellent performance and advantage of the purifying agent of this invention are clearly seen from the results of Examples given hereinafter, and the invention is in no way limited by the aforesaid presumed mechanisms of purification.

It has been found that the hydrotalcite compound of formula (1) or a calcination product thereof obtained by calcination at a temperature of up to about 900° C. is an excellent, unique purifying agent for cooling water used in nuclear reactors which can efficiently capture and remove both undesirable metal cations and anions in cooling water for nuclear reactors, and can also remove minor amounts of undesirable impurities in the cooling water efficiently and easily.

Investigations by the present inventors have also shown that the hydrotalcite compound of formula (1) or a calcination product thereof obtained by calcination at a temperature of up to about 900° C. has resistance to temperatures of up to about 300° C. which are much higher than those temperatures which ion exchange resins heretofore used in the purification of cooling water for nuclear reactors can withstand, and therefore can advantageously solve the technical problem of heat loss in the prior art. They have additionally shown the hydrotalcite compound or its calcination product tends to show higher activity as the temperature is higher in the removal of impurities from the cooling water, and therefore, the trouble of heat loss can be overcome and the removing efficiency is further increased.

It is an object of this invention therefore to provide a new type of purifying agent for cooling water used in nuclear reactors.

Another object of this invention is to provide a method of purifying cooling water for nuclear reactors.

The above and other objects and advantages of this invention will become apparent from the following description.

The purifying agent for cooling water used in reactors provided by this invention contains as an active ingredient a hydrotalcite compound of the following formula $$M_{1-x}^{2+}M_x^{3+}(OH)_2A_{x/n}^{n-}\cdot mH_2O \quad (1)$$

wherein $M^{2+}$ represents a divalent metal cation, $M^{3+}$ represents a trivalent metal cation, $A^{n-}$ represents an anion having a valence of n, and x and m satisfy the following expressions $$0 < x < 0.5$$

$$0 \leq m < 1$$

or a calcined product thereof obtained by calcination at a temperature of up to about 900° C.

In the general formula (1) above, examples of the divalent metal cation $M^{2+}$ are $Mg^{2+}$, $Ni^{2+}$ and $Zn^{2+}$, and examples of the trivalent metal cation $M^{3+}$ are $Al^{3+}$, $Fe^{3+}$ and $Cr^{3+}$. Examples of the anion having a valence of n represented by $A^{n-}$ are mono- to tetravalent anions such as $OH^-$, $Br^-$, $CO_3^{2-}$, $SO_4^{2-}$, $PO_4^{3-}$, $Fe(CN)_6^{3-}$, $Fe(CN)_6^{4-}$ and $CH_3COO^-$.

In the present invention, a calcination product obtained by calcining the hydrotalcite compound represented by formula (1) at a suitable temperature of up to about 900° C., preferably at a temperature at which a solid solution is formed, may also be used. The calcining temperature for forming a solid solution is, for example, about 400° to 900° C., preferably about 500° to 700° C. The calcination treatment can be carried out in air under atmospheric pressure. It can also be carried out under reduced or elevated pressures, or in an atmosphere of an inert gas such as $N_2$ and $CO_2$. Preferably, it is carried out under reduced pressure and/or in an inert gaseous atmosphere.

Preferred calcination products are those obtained by calcining hydrotalcite compounds of formula (1) in which $M^{2+}$ is $Mg^{2+}$ and $M^{3+}$ is $Al^{3+}$. Specific examples of such solid solutions are magnesium oxide-type solid solutions represented by the following formula $$(Mg_{1-y}Al_y)O_{1+\frac{1}{2}y}$$

wherein y is $0 < y < 0.5$, preferably $0.1 \leq y \leq 0.35$, in which a trivalent metal (Al in this example) dissolves in a divalent metal oxide (magnesium oxide in this example). Since in this example aluminum dissolves in magnesium oxide, the X-ray powder diffraction pattern of the solid solution is that of magnesium oxide, but its lattice constant is usually in the range of 4.150 to 4.210 Å (25° C.) which is smaller than the lattice constant (4.213 Å at 25° C.) of magnesium oxide.

One example of the aforesaid mechanism by which such a calcination product takes up an anion into its structure will be described. For example, when a solid solution of the formula $(Mg_{0.7}Al_{0.3})O_{1.15}$ obtained by calcining a hydrotalcite of the composition formula $Mg_{0.7}Al_{0.3}(OH)_2(CO_3)_{0.15}\cdot 0.5H_2O$ at a temperature of about 400° to 900° C. is used, the mechanism by which the solid solution takes up the anion $A^{n-}$ as a constituent component into its structure when it is re-converted to the hydrotalcite in the presence of water can be shown by the following formula.

$$(Mg_{0.7}Al_{0.3})O_{1.15} + A^{n-} + m'H_2O \rightarrow Mg_{0.7}Al_{0.3}(OH)_2A_{0.3/n}^{n-}\cdot mH_2O$$

Cooling water used in a reactor can be purified by a simple method of contacting it with the purifying agent of this invention comprising the hydrotalcite compound of formula (1) or its calcination product obtained as above as an active ingredient.

The mode of contacting can be properly selected. For example, the cooling water and the purifying agent are mixed and fully contacted and then the mixture is filtered. Or the cooling water is passed through a layer filled with the purifying agent. In short, any suitable mode may be employed by which the cooling water is effectively contacted with the purifying agent.

Since, as stated above, the purifying agent of this invention withstands temperatures of up to about 350° C. and shows high activity within the high temperature range, it is not necessary to cool the cooling water to be purified, which is in the heated state at about 300° C., to below about 60° C. as in the prior art involving the use of ion exchange resins. Accordingly, the trouble of heat loss, one great technical problem in the prior techniques of purifying cooling water used in reactors, can be circumvented by the present invention, and both metal cations, such as radioactive cobalt, and anions, such as a chlorine ion, which are present in the cooling water, can be efficiently captured and removed by using this single purifying agent.

The purification can be carried out at temperatures below the high temperature resistance limit of the purifying agent of this invention, for example below about 350° C. Preferably, it is carried out at higher temperatures within the range of about 100° to about 300° C.

Preferably, in the practice of the purifying method of this invention, the hydrotalcite of formula (1) or its calcination product obtained by calcination at a temperature of up to about 900° C. is used in the form of granules because the resistance of the flowing liquid is low, it lends itself to easy filtration and handling, and there is no likelihood of the fine particles of the purifying agent being mixed with cooling water during filtration. Any suitable granulating means can be used to granulate the purifying agent. For example, granulation may be carried out by extrusion, tumbling, compression, fluidization or otherwise. The shape and size of the granules may be properly selected. The granules may be in any desired shape such as a spherical, solid cylindrical, hollow cylindrical or pyramidal shape, and their sizes may range, for example, from about 1 to about 20 mm in diameter or height. Suitable binders may be utilized in the granulation process. Examples of the suitable binders include polyvinyl alcohol, apatite, bentonite, hectorite, montmorillonite and smectite. About 1 to about 20%, based on the weight of the hydrotalcite compound, of such a binder is mixed with the hydrotalcite compound, and a suitable amount (about 10 to about 50% based on the weight of the hydrotalcite compound) of water is added. The mixture is kneaded fully by a kneader or the like for a period of about 10 to 60 minutes. The kneading is continued until the mixture becomes a viscous wet mass. Then, the wet mass is molded into various shapes by the aforesaid means.

The following Examples illustrate the purifying agent and method of this invention more specifically.

EXAMPLES 1-4

A cobalt ion and a chlorine ion are two important impurities to be removed from cooling water used in a nuclear reactor because the former has a long half life of radioactivity and therefore causes high degrees of environmental pollution and toxicity to humans, and the chlorine ion is highly corrosive.

$CoCl_2$ of the special reagent grade was dissolved in distilled water to prepare 1 liter of a sample solution containing 50 ppm of Co and 60 ppm of Cl. Each of the hydrotalcite compounds shown in Table 1 was kneaded with nearly the same weight of water in a kneader. The mixture was extruded into pellets having a diameter of about 1 mm and the lengths of the pellets were adjusted to about 2 mm by using a Marumerizer (a trade name for a spherorizing wet extruder). The pellets were then dried to form a purifying agent.

To the sample solution was added 1.0 g of the hydrotalcite purifying agent, and the mixture was treated at 150° to 300° C. for 30 minutes in an autoclave. The mixture was filtered, and the amounts of Co and Cl in the filtrate were determined both by atomic absorptiometry and by the absorbance method in accordance with JIS K-0101. The specific resistance of the filtrate was measured by an electrical conductivity meter. Low specific resistances mean that the purifying agent is not dissolved and is substantially nontoxic. The results are shown in Table 1.

TABLE 1

| Example | Adsorbent | Treating temperature 150° C. Amount adsorbed (mg/g) Co | Cl | Specific resistance (25° C.) (Ω-cm) | Treating temperature 200° C. Amount adsorbed (mg/g) Co | Cl | Specific resistance (25° C.) (Ω-cm) | Treating temperature 300° C. Amount adsorbed (mg/g) Co | Cl | Specific resistance (25° C.) (Ω-cm) |
|---|---|---|---|---|---|---|---|---|---|---|
| 1 | $Ni_{0.7}Al_{0.3}(OH)_{2.3} \cdot 0.7H_2O$ | 46 | 47 | $5.5 \times 10^5$ | 47 | 51 | $5.7 \times 10^5$ | 49 | 56 | $6.1 \times 10^5$ |
| 2 | $Mg_{0.8}Al_{0.2}(OH)_2(CO_3)_{0.1} \cdot 0.57H_2O$ | 49 | 44 | $2.1 \times 10^5$ | 49 | 45 | $2.2 \times 10^5$ | 49 | 47 | $2.5 \times 10^5$ |
| 3 | $Ni_{0.6}Fe_{0.4}(OH)_2 \begin{pmatrix} COO^- \\ | \\ COO^- \end{pmatrix}_{0.15} \cdot 0.51H_2O$ | 33 | 40 | $6.2 \times 10^5$ | 35 | 43 | $6.4 \times 10^5$ | 37 | 46 | $6.6 \times 10^5$ |
| 4 | $Zn_{0.7}Al_{0.3}(OH)_2(SO_4)_{0.15} \cdot 0.40 H_2O$ | 42 | 42 | $3.2 \times 10^5$ | 45 | 45 | $3.5 \times 10^5$ | Adsorbent decomposed | | |

EXAMPLE 5

A hydrotalcite of the following composition $$Mg_{0.72}Al_{0.28}(OH)_2(CO_3)_{0.14} \cdot 0.52H_2O$$

was kneaded with nearly the same weight of water. The mixture was granulated into solid cylindrical pellets having a diameter of 2.0 mm by an extrusion granulator, and the sizes of the pellets were adjusted by a Marumerizer. The pellets were dried, and calcined at 500° C. for 1 hour to form a purifying agent in accordance with this invention ($Mg_{0.72}Al_{0.28}O_{1.14}$). Then, 0.5 g of the purifying agent was added to 1 liter of distilled water containing 25 ppm of Co and 30 ppm of Cl, and the mixture was reacted for 30 minutes at 200° and 300° C. respectively. The results are shown in Table 2.

EXAMPLE 6

A hydrotalcite of the following composition $$Zn_{0.8}Fe_{0.2}(OH)_2Br_{0.2} \cdot 0.51H_2O$$

was granulated into pellets having a diameter of about 0.7 mm by the same operation and under the same conditions as in Example 5, and then calcined at 380° C. for 1 hour to form a purifying agent of this invention ($Zn_{0.8}Fe_{0.2}O_{1.1}$). Using the purifying agent, the same $CoCl_2$ adsorption test as in Example 5 was conducted. The results are shown in Table 2.

EXAMPLE 7

A hydrotalcite of the following composition $$Ni_{0.6}Al_{0.4}(OH)_2Cl_{0.4}\cdot 0.42H_2O$$

was granulated into solid cylindrical pellets having a diameter of about 0.7 mm by the same operation and under the same conditions as in Example 5. The pellets were calcined at 400° C. for 1 hour. Using the resulting purifying agent in accordance with this invention ($Ni_{0.6}Al_{0.4}O_{1.2}$), the same $CoCl_2$ adsorption test as in Example 5 was conducted. The results are shown in Table 2.

TABLE 2

| Example | Treating temperature 250° C. | | | Treating temperature 300° C. | | |
| --- | --- | --- | --- | --- | --- | --- |
| | Amount adsorbed (mg/g) | | Specific resistance (Ω-cm) | Amount adsorbed (mg/g) | | Specific resistance (Ω-cm) |
| | Co | Cl | | Co | Cl | |
| 5 | 25 | 28 | $1.8 \times 10^5$ | 25 | 29 | $2.1 \times 10^5$ |
| 6 | 21 | 22 | $3.4 \times 10^5$ | 21 | 25 | $3.8 \times 10^5$ |
| 7 | 12 | 15 | $6.1 \times 10^5$ | 14 | 17 | $6.3 \times 10^5$ |

What is claimed is:

1. A method of purifying cooling water used in nuclear reactors and containing at least one of cationic and anionic impurities, which comprises contacting said cooling water with a hydrotalcite compound of the following formula $$M_{1-x}^{2+}M_x^{3+}(OH)_2A_{x/n}^{n-}\cdot mH_2O \qquad (1)$$

wherein $M^{2+}$ represents a divalent metal cation, $M^{3+}$ represents a trivalent metal cation, $A^{n-}$ represents an anion having a valence of n, and x and m satisfy the following expressions $$0 < x < 0.5$$

$$0 \leq m < 1$$

or a calcined product thereof obtained by calcination at a temperature of up to about 900° C.

2. The method of claim 1 wherein the hydrotalcite compound or the calcined product thereof is in the form of granules.

3. The method of claim 1 wherein the contacting is carried out at a temperature of about 100° to about 300° C.

4. The method of claim 1 wherein in formula (1), $M^{2+}$ is at least one divalent metal cation selected from the group consisting of $Mg^{2+}$, $Ni^{2+}$ and $Zn^{2+}$, and $M^{3+}$ is at least one trivalent metal cation selected from the group consisting of $Al^{3+}$, $Fe^{3+}$ and $Cr^{3+}$.

5. The method of claim 1, wherein $A^{n-}$ in formula (1) is a mono- to tetravalent anion.

6. The method of claim 5 wherein $A^{n-}$ is a mono- to tetravalent anion selected from the group consisting of $OH^-$, $Br^-$, $CO_3^{2-}$, $SO_4^{2-}$, $PO_4^{3-}$, $Fe(CN)_6^{4-}$ and $CH_3COO^-$.

7. The method of claim 1, wherein said impurities include radioactive cobalt cation, chlorine anion, or mixtures thereof.

8. The method of claim 1 wherein in formula (1), the divalent metal is selected from the group consisting of Mg, Ni and Zn, the trivalent metal is selected from the group consisting of Al, Fe, and Cr and the anion is a mono- to tetravalent anion selected from the group consisting of $OH^-$, $Br^-$, $CO_3^{2-}$, $SO_4^{2-}$, $PO_4^{3-}$, $Fe(CN)_6^{3-}$, $Fe(CN)_6^{4-}$, and $CH_3COO^-$.

9. A method of purifying cooling water used in nuclear reactors and containing cationic and/or anionic impurities including radioactive cobalt cation, chlorine anion or mixtures thereof, which comprises contacting said cooling water with a hydrotalcite compound selected from the group consisting of:

$$Ni_{0.7}Al_{0.3}(OH)_{2.3}\cdot 0.7H_2O,$$
$$Mg_{0.8}Al_{0.2}(OH)_2(CO_3)_{0.1}\cdot 0.57H_2O,$$

$$Ni_{0.6}Fe_{0.4}(OH)_2\begin{pmatrix}COO^-\\|\\COO^-\end{pmatrix}_{0.15}\cdot 0.51H_2O$$

$$Zn_{0.7}Al_{0.3}(OH)_2(SO_4)_{0.15}\cdot 0.40H_2O$$
$$Mg_{0.72}Al_{0.28}(OH)_2(CO_3)_{0.14}\cdot 0.52H_2O$$
$$Zn_{0.8}Fe_{0.2}(OH)_2Br_{0.2}\cdot 0.51H_2O \text{ and}$$
$$Ni_{0.6}Al_{0.4}(OH)_2Cl_{0.4}\cdot 0.42H_2O$$

or a calcined product thereof obtained by calcination at a temperature of up to about 900° C.

* * * * *

UNITED STATES PATENT AND TRADEMARK OFFICE
CERTIFICATE OF CORRECTION

PATENT NO. : 4,642,193
DATED : Feb. 10, 1987
INVENTOR(S) : SHIGEO MIYATA, ET AL.

It is certified that error appears in the above-identified patent and that said Letters Patent is hereby corrected as shown below:

IN THE CLAIMS

Claim 6, line 3, (column 8, line 16), after "$PO_4^{3-}$", insert --$Fe(CN)_6^{3-}$--.

Signed and Sealed this

Twenty-second Day of September, 1987

Attest:

DONALD J. QUIGG

Attesting Officer   Commissioner of Patents and Trademarks